Sept. 17, 1963   H. B. WHITEHURST ET AL   3,103,722
PRODUCTION OF GLASS REINFORCED METAL ARTICLES
Filed Dec. 30, 1958   3 Sheets-Sheet 1
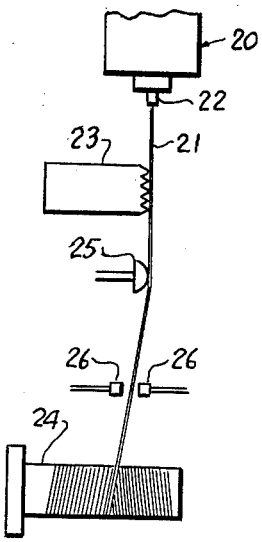
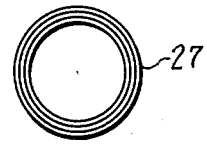
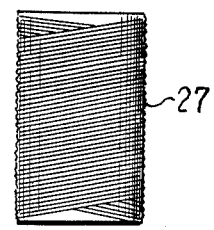
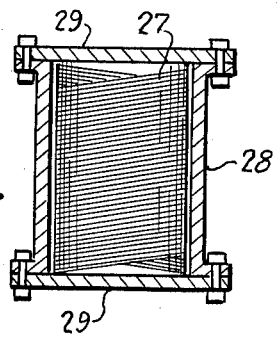
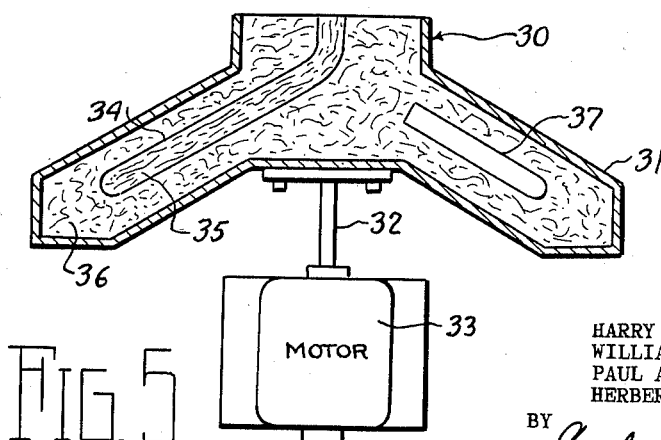
INVENTORS
HARRY B. WHITEHURST
WILLIAM P. WARTHEN
PAUL A. LOCKWOOD
HERBERT B. AILES
BY
ATTORNEYS

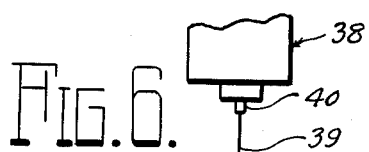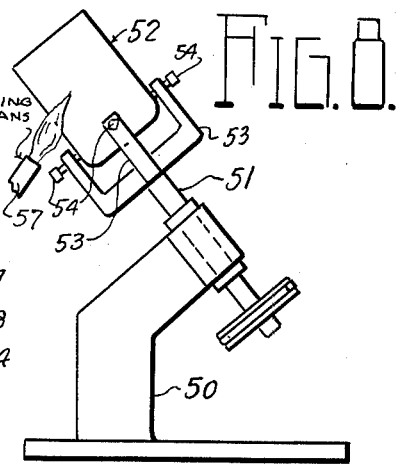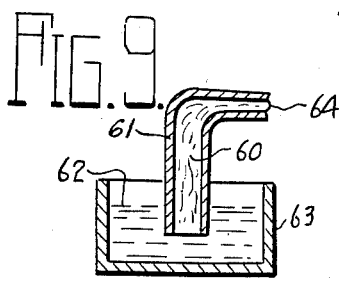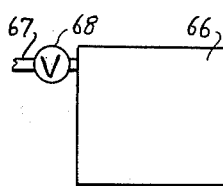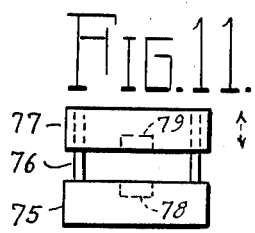

Sept. 17, 1963    H. B. WHITEHURST ET AL    3,103,722
PRODUCTION OF GLASS REINFORCED METAL ARTICLES
Filed Dec. 30, 1958    3 Sheets-Sheet 3

INVENTORS
Harry B. Whitehurst, William P. Warthen,
Paul A. Lockwood & Herbert B. Ailes
BY
ATTORNEYS United States Patent Office 3,103,722
Patented Sept. 17, 1963

3,103,722
PRODUCTION OF GLASS REINFORCED
METAL ARTICLES
Harry B. Whitehurst, William P. Warthen, Paul A. Lockwood, and Herbert B. Ailes, all of Newark, Ohio, assignors to Owens-Corning Fiberglas Corporation, a corporation of Delaware
Filed Dec. 30, 1958, Ser. No. 783,916
3 Claims. (Cl. 22—202)

This invention relates to the production of glass-reinforced metal articles, and, more particularly, to the production of such articles by techniques which provide a pressure differential between a body of molten metal and a gas associated with a body of glass reinforcement.

Various suggestions have heretofore been made for producing glass-reinforced metal articles. However, it has been found that numerous difficulties are encountered when it is attempted to carry such suggestions into actual practice. For example, if fine glass fibers are packed into a cylindrical cavity defined by a suitable mold, and molten aluminum is poured into such mold cavity, it is found, after solidification of the aluminum, that relatively large bundles of the fibers are likely to be completely uncoated by the metal, with the result that the technique fails to produce a sound, glass-reinforced aluminum body.

The present invention is based upon the discovery that sound glass-reinforced metal articles can be produced by what has been denominated pressure differential casting, wherein a mold cavity packed with the desired glass reinforcement is maintained at a low pressure relative to a body of molten metal to be forced thereinto.

It is, therefore, an object of the invention to provide an improved method for producing glass-reinforced metal articles.

It is also an object of the invention to provide a centrifugal method for producing glass-reinforced metal articles.

It is a further object of the invention to provide a method for producing glass-reinforced metal articles wherein metal is forced into a mold cavity by virtue of a pressure differential between a mold cavity or a gas associated with a body of glass-reinforcement contained therein and the body of molten metal.

Other objects and advantages will be apparent from the description which follows, reference being made to the accompanying drawings, in which—

FIG. 1 is a schematic representation of an apparatus for producing glass fibers, applying a metal coating to the fibers, and winding the fibers in a generally cylindrical mass on an appropriate collet;

FIG. 2 is an end view of the generally cylindrical mass of metal coated fibers produced by the apparatus of FIG. 1;

FIG. 3 is a front view of the generally cylindrical mass of metal coated fibers of FIG. 2;

FIG. 4 is a view partially in vertical section showing the cylindrical mass of metal coated fibers of FIGS. 2 and 3 positioned in a rotatable mold in condition for centrifugal casting;

FIG. 5 is a partially schematic vertical sectional view showing different apparatus for the centrifugal casting of glass-reinforced metal articles;

FIG. 6 is a schematic representation of apparatus for producing glass fibers, applying a metal coating thereto, and forming the coated fiber into a cylindrically shaped article composed of metal reinforced with the glass fibers;

FIG. 7 is a schematic view in vertical elevation showing modified apparatus for centrifugal casting of glass-reinforced metal articles;

FIG. 8 is a vertical sectional view of a preferred crucible for use in the apparatus of FIG. 7;

FIG. 9 is a vertical sectional view showing a bath of molten metal and a mold cavity filled with glass reinforcement into which cavity the molten metal can be forced by differential pressure, and specifically differential pressure resulting from the application of vacuum to the mold cavity;

FIG. 10 is a view in vertical elevation showing apparatus for producing glass-reinforced metal articles by a differential pressure technique wherein the molten metal is maintained under super atmospheric pressure to establish the desired pressure differential;

FIG. 11 is a schematic view in vertical elevation of a die press which can be used for final shaping of glass reinforced articles produced in accordance with the invention;

FIG. 12 is a plan view of apparatus for rotating the mold of FIG. 4;

FIG. 13 is a view in vertical section along the line 13—13 of FIG. 12;

Figure 14:
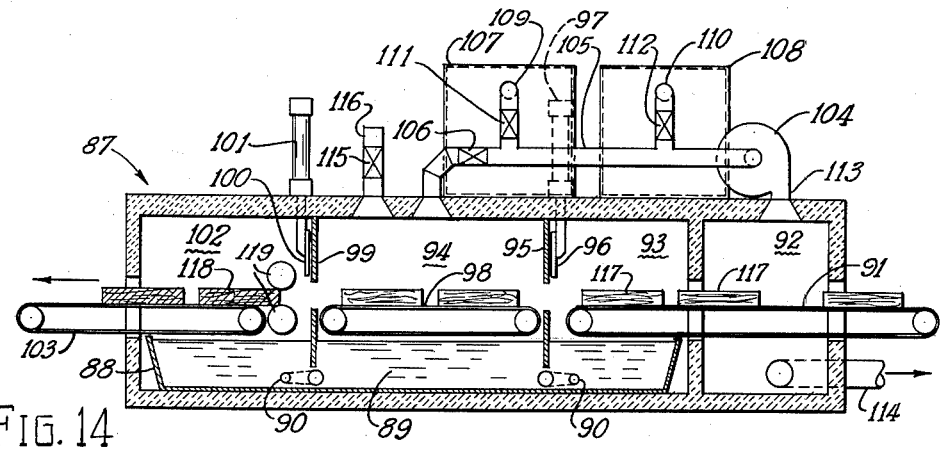
FIG. 14 is a view in vertical, longitudinal cross section of apparatus for impregnating glass fiber packs with metal by a semi-continuous process.

Referring now in more detail to the drawings, a glass melting tank is indicated generally at 20 in FIG. 1. Glass fibers 21 are drawn through bushings 22 in the bottom of the tank 20, across the face of a metal applicator 23, and are wound on a suitably driven collet 24. The forward edge of the metal applicator 23 is serrated. Molten metal flows through openings in the serrated wall of the applicator and hangs in globules through which the fiber 21 passes. The metal coated fibers pass over a gathering shoe 25 and between traversing guides 26 which advance the strand a given increment axially along the collet 24 for every winding revolution thereof so that each layer is generally the shape of a spiral, and each strand in the spiral crosses a plurality of strands in the layers thereabove and therebelow. After the desired number of layers of metal coated strands have been collected on the collet 24, a generally cylindrical casting preform 27 shown in FIGS. 2 and 3 can be separated from the collet, and is ready for formation into a tubular casting by centrifugal techniques. The collet 24 can advantageously be a tube formed from a length of screening made from wires of the metal which will alloy therewith. In this case the screen collet constitutes a part of, and tends to stiffen, the preform, and is melted during a centrifugal casting operation, as discussed below.

A tubular casting can be formed from the preform 27 by placing the preform in a mold 28 having a cylindrical mold cavity of approximately the same diameter as the outside diameter of the preform. The mold 28 can then be rotated in any desired manner while the preform is heated to a temperature sufficiently high to fuse the metal. Centrifugal force which results from rotation of the mold and the preform therein maintains the molten metal and the glass fibers in a cylindrical form closely adjacent the interior of the mold 28, and forces the composite mass into a unitary structure. Any air entrapped within the space originally occupied by the preform tends preferentially to migrate toward the axis of rotation since, because of its extremely low specific gravity, only a slight centrifugal force operates on it. Both metal and glass, however, have comparatively high specific gravities and are forced against the interior of the mold cavity. This technique gives optimum results when the metal and the glass both have about the same densities.

It will be observed that the mold 28 is provided with covers 29 which are bolted over the open ends thereof so that the molten metal therein is, in effect, confined, and the pressure developed by centrifugal force is transmitted in all directions through the body of metal. Suitable apparatus for producing a centrifugal casting using the mold 28 with a pre-form 27 enclosed therein is shown in FIGS. 12 and 13. It will be seen in FIG. 12 that one of the covers 29 is bolted against a plate 81, which is integral with a drive shaft 82 of a motor 83. The mold 28 is supported by a bearing block 84 provided with a plurality of bearing races in which ball bearings 85 are positioned. Heating to fuse the metal coating on the fibers in the pre-form 27 can be accomplished by pouring molten metal through an opening 86 in the exposed cover 29, or the mold 28 can be exteriorly heated to accomplish such fusion. Heat that is supplied also fuses a screen collet 42, if used as a part of the preform 27. Glass-fiber reinforced aluminum tubular members produced in this manner have been found to have excellent physical properties at comparatively high temperatures, but, at the same time, to retain the high strength to weight ratio which is characteristic of aluminum. This is important in many fields where structural materials having both a high strength to weight ratio, and also the capability of retaining strength at elevated temperatures are required.

Although the invention is in no way limited to this theoretical explanation, it is believed that the pressure of the confined metal is of great assistance in achieving complete wetting of the glass fibers. It has been observed, for example, that small diameter fibers of a given glass composition are not thoroughly coated when immersed in molten aluminum. In some cases there may be what has the appearance of an aluminum coating on the small diameter fibers, but this seeming coating can easily be stripped from the fiber manually. It is believed that the inability of aluminum to coat such small diameter fibers indicates that the aluminum, when molten, was not forced into contact with all parts of the immersed fibers. It is further believed, therefore, that the molten aluminum, or other metal, is forced into intimate contact with all parts of fibers by the centrifugal technique described above, and that the pressure exerted on the confined molten metal is responsible for the production of sound castings in this way. It will be appreciated that the minimum pressure necessary in order to produce sound castings in this manner depends upon the diameter of the fibers to be used as glass reinforcement, and the viscosity and surface tension of the metal (and, therefore, its temperature).

It follows from the foregoing discussion that the minimum centrifugal force required to produce sound castings by this method depends upon fiber diameter and upon the temperature that is employed, because of the effect of temperature upon viscosity and surface tension of the metal. In general, using fibers having a diameter as low as about 0.0004 inch in diameter, and aluminum as the metal to be reinforced, sound castings have been produced by this centrifugal technique where a mold cavity with a diameter of 5 inches was rotated as slowly as about 3510 revolutions per minute. Higher rotational speeds would be indicated with finer fibers or smaller diameter molds, or lower rotational speeds could be used with coarser fibers or larger diameter molds. It will be appreciated from the foregoing discussion that only practical considerations limit the maximum revolutions per minute that can be employed in producing castings according to this method. Ordinarily, however, there is no reason to rotate a mold at a rate sufficient to give the outside of the mold a velocity of more than about 5000 lineal feet per minute. Usually the rate of rotation should be sufficient that the centrifugal force acting on the metal is at least about 3 times, but not more than about 300 times, the normal force of gravity.

Heating to melt the metal coatings on the fibers in centrifugal casting by this technique can be accomplished in any of several ways. For example, the mold 28, with the preform 27 positioned therein as shown in FIG. 4, can be placed in an appropriate oven and heated to a desired temperature above the melting point of the metal. If desired, suitable high temperature flames can also be played on the exterior of the mold 28 while it is rotated. Additional metal, beyond that which is adhered to the fibers as coatings, can be employed in producing castings in this manner. For example, powdered metal, which could be the same as the metal applied as fiber coatings, or could be an appropriate different metal for alloying therewith, can be added to the interior of the preform 27 prior to closing of the mold 28, and a centrifugal casting can be produced by rotating the mold 28 while heating in either of the ways described above. If desired, molten metal itself can be used as the sole source of heat by providing an opening in one of the plates 29 and pouring molten metal into the mold 28 during rotation thereof. Molten metal can also be added to the mold when exterior heating is employed and the proportion of glass reinforcement to metal can be controlled in this manner.

A modified apparatus for centrifugal casting of glass reinforced metal articles is indicated generally at 30 in FIG. 5. The apparatus 30 comprises a centrifuge cover 31 mounted on the shaft 32 of a motor 33. A tube 34 containing glass reinforcement 35, which can be in the form of fibers, flakes, or the like, is supported inside the cover 31 in any suitable packing material 36. An appropriate counterweight 37 is also mounted in the cover 31 embedded in the packing material 36. A casting can be produced centrifugally in the apparatus 30 by operating the motor 33 to rotate the cover 31 at any desired speed, for example from about 3 to about 600 revolutions per minute, although satisfactory results have been achieved in the apparatus shown using a rotational speed as high as about 1750 revolutions per minute, and then pouring a desired metal, in liquid form, into the tube 34. Centrifugal force urges the molten metal to the lower extremity of the tube 34 and forces it into intimate contact with all parts of the glass reinforcement 35 contained within the tube 34, as described above. After the desired amount of molten metal has been poured into the tube 34 rotation is continued until the metal therein has solidified, and a completed casting has been produced.

Apparatus shown in FIG. 6 comprises a glass melting tank indicated generally at 38 from which glass fibers 39 are drawn through bushings 40. If desired, an appropriate metal is coated on the fibers 39 as they pass along a serrated front edge of a metal applicator 41 similar to the applicator 23 shown in FIG. 1, and before they contact a guide wheel 42. Single wheel pullers 43 are used to draw the fibers and to attenuate the molten streams which flow from the bushings 40 to a desired diameter. Fibers discharged from the single wheel pullers 43 are thrown upon a table 44 which rotates in the direction indicated by the arrow at a sufficient rate to project fibers against a traversing collector 45 which rotates in the opposite direction from the table 44 and traverses, as indicated by the arrow, upwardly and downwardly so that a cylindrical package of fibers, either bare or metal coated, is collected on the interior cylindrical surface thereof. A metal flame spray gun or nozzle 46 is positioned just above the rotating table 44 to direct either discrete droplets of molten metal and flame, or a stream of spray of molten metal against the interior of a tubular pack 47 of collected fibers, if desired.

The apparatus of FIG. 6 can be operated in any of several ways. For example, a metal coating can be applied to the fibers, using the applicator 41, and a sufficient quantity of molten metal can be applied to the tubular pack which is formed, using the metal flame spray gun or nozzle 46, to provide a matrix of the same or a different metal so that a glass-reinforced metal article is produced directly in the apparatus. If desired, the metal flame spray gun or metal nozzle 46 can be inactivated so that a pack of coated fibers is produced. The pack of coated fibers can then be formed into a desired glass-reinforced metal article in the manner previously discussed in connection with FIG. 4, or in any other suitable way, for example, by rolling, extrusion or die casting, as subsequently explained in detail. The metal applicator 41 can also be inactivated, if desired, and either a tubular preform comprising metal and fibrous glass or a glass-reinforced metal article produced directly from the fibers and metal applied from the flame spray gun or nozzle 46.

Apparatus shown in FIGS. 7 and 8 comprises a support 50 to which is journaled a shaft 51 which carries a crucible 52, suitably attached thereto, as by arms 53 and set screws 54. A wheel 55 is keyed to the shaft 51, and can be driven in any suitable manner, for example by a motor and pulley, to rotate the shaft 51 and the crucible 52. Any suitable heating means such as a burner 57 is provided to supply heat to the crucible-sleeve combination, either while stationary or while rotating. As can be seen in FIG. 7, the crucible 52 is preferably provided with interior threads 58 which can be integral therewith, or separate therefrom, and are either right hand threads or left hand threads, depending upon the direction of rotation of the crucible, as described above, so that material contained within the crucible is urged to the bottom thereof by the threads during rotation.

The apparatus shown in FIGS. 7 and 8 is particularly adapted for the production of metal billets containing glass reinforcement, which can be in the form of glass fibers, glass flakes or the like. Such billets can then be formed in a desired shape, for example by die casting, as in the apparatus represented in FIG. 11, by rolling, extrusion, or in any other suitable manner. The glass reinforcement in the centrifugally formed billets is uniformly coated by the metal, by virtue of the centrifugal forces which act upon the latter, as discussed above. If desired, a plurality of centrifuging operations can be carried out, and intermediate hot swaging of the billets employed, in order to build up any desired billet size.

Castings can also be produced in accordance with the method of the invention as shown in FIG. 9 by packing glass reinforcement 60, for example in the form of flakes, fibers or the like, in a suitable mold 61, immersing the lower end of the mold 61 in a bath 62 of molten metal contained in an appropriate vessel 63, and applying vacuum to an open end 64 of the mold 60. A part of the molten metal 62 is forced into the mold 60 by differential pressure. It has been found that sound castings can be produced in this manner using, for example, commercially available fibrous glass packed in the mold 61 and molten aluminum. It will be appreciated that the mechanism which is suggested above as being responsible for the production of sound castings by the centrifugal methods according to the invention can also account for the satisfactory castings produced as described in this paragraph. Gas filled portions of the mold 61 are under reduced pressure by virtue of the applied vacuum, while metal which is forced into the mold cavity is under essentially atmospheric pressure, so that a force which may be as high as about 14 pounds per square inch in easily attainable conditions, tends to force the molten metal into intimate contact with all parts of the glass reinforcement. Much greater pressure differentials can, of course, be established by the centrifugal methods, or using the apparatus shown in FIG. 10. The apparatus of FIG. 10 comprises a pressure vessel 66 which can be of any suitable material for containing a desired molten metal, and can, if desired, include electric resistance or other heating means to maintain the metal in a molten condition. Molten metal under pressure can be admitted to the vessel 66 through a line 67 by opening a valve 68, and a desired working pressure can be maintained during operation by appropriate additions of the molten metal to the vessel in this manner, or a single charge of metal can be introduced into the vessel 66 and the desired pressure maintained during operation by means of compressed air admitted through the line 67, and valve 68. A suitable mold 69 is releasably connected through a line 70 and a valve 71 to the pressure vessel 66, and is also provided with a discharge vent 72 fitted with a valve 73.

In order to produce glass-reinforced metal articles in the apparatus of FIG. 10 the cavity of the mold 69 is packed with the desired glass reinforcement which can be in the form of fibers, flakes, or in other form, and the mold is then sealed in any suitable manner and connected to the line 70. Molten metal is then introduced into the vessel 66 and pressurized in any suitable manner, and the valve 71 is opened to enable the molten metal to flow through the line 70 and to fill the cavity of the mold 69. The valve 73 should be open while the mold cavity is being filled, and can be closed when molten metal appears at the discharge end of the line 72.

Glass-reinforced billets or other shapes, including the preforms discussed in connection with FIGS. 1–3, can, if desired, be shaped by extrusion, rolling, or die casting techniques, for example using a press represented schematically in FIG. 11. The press of FIG. 11 comprises an appropriately mounted stationary base 75, guides 76, and an upper platen 77 slidable on the guides 76, and driven in any suitable manner, as by an eccentric or by hydraulic means. Any of the indicated articles can be heated to convert the metal to a plastic condition, placed in the cavity of a die half 78 appropriately embedded in the base 75 and then formed into a desired shape by lowering the platen 77 to bring a cooperating die half 79 embedded therein into cooperative relationship with the die half 78.

Figure 15:
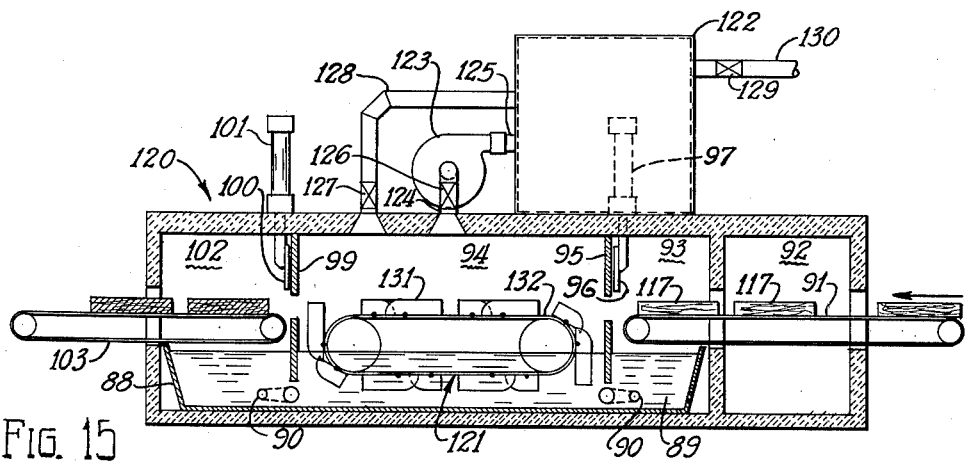
FIG. 15 is a view in vertical, longitudinal cross section showing modified apparatus for impregnating glass fiber packs with metal by a semi-continuous process.
Figure 16:
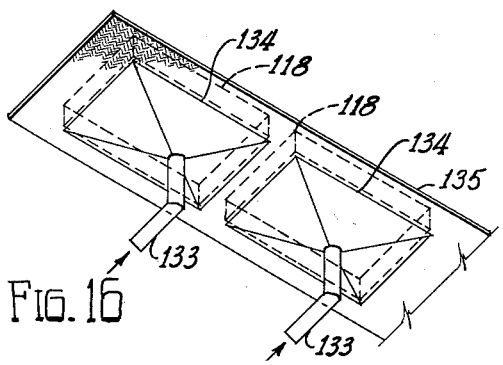
FIG. 16 is a detailed view in perspective of apparatus which can be substituted for parts of the apparatus shown in FIGS. 14 and 15.

The apparatus shown in FIG. 14 and the modifications illustrated in FIGS. 15 and 16 can be employed to impregnate glass fiber packs with metal by a semi-continuous process. Referring to FIG. 14, a furnace indicated generally at 87 has a container 88 holding a pool 89 of metal heated by radiant tubes 90 or other suitable sources of heat. A charge conveyor 91 extends through a pre-heat chamber 92 and into a charge chamber 93 maintained at atmospheric pressure. A vacuum chamber or cavity 94 adjacent the charge chamber 93 is separated therefrom by a dividing wall 95 and a remotely controlled door 96 raised and lowered by a hydraulic ram 97, or other suitable device. A second conveyor 98 transverses the vacuum chamber 94 from the wall 95 to a second dividing wall 99 and a remotely controlled door 100 which is raised and lowered by a hydraulic ram 101, or other suitable device. The wall 99 and the door 100 separate the vacuum chamber 94 from a discharge chamber 102, which, like the charge chamber 93, is maintained at atmospheric pressure. A discharge conveyor 103 extends out of the chamber 102 at the discharge end of the furnace.

The vacuum chamber 94 is evacuated by means of a suitable pump 104 connected to the chamber 94 by an intake line 105 having a valve 106. The intake line 105 is also connected to vacuum surge tanks 107 and 108 through lines 109 and 110 having valves 111 and 112. When the valve 106 is closed, the valves 111 and 112 in the lines 109 and 110 are opened to enable the vacuum pump 104 to evacuate the surge tanks 107 and 108. Subsequently, when its is desired to evacuate the chamber 94, the valves 106, 111 and 112 are opened, and the tanks 107 and 108 assist the vacuum pump 104 in evacuation thereof. An outlet line 113 for the vacuum pump 104 can be connected to the preheat chamber 92 which has a vent 114 spaced from the outlet line 113 to enable gases exhausted from the chamber 94 to flow through and warm the preheat chamber 92. A valve 115 in a vent line 116 is provided to restore atmospheric pressure to the chamber 94, after it is evacuated.

In operation, suitable packs 117 of glass fibers are carried through the preheat chamber 92 by the conveyor 91 where they are preheated by the warm gases passed through the chamber 92 from the chamber 94 and the vent line 114 by the pump 104. The packs 117 are carried into the charge chamber 93 where they are further heated, being directly over a portion of the molten metal in the pool 89 and are then transferred to the conveyor 98, the door 96 being open, and are carried into the chamber 94. Two or more of the packs 117 can be handled at one time, depending on their size relative to the size of the furnace 87. With the pack 117 positioned in the chamber 94, the doors 96 and 100 are closed to seal off the chamber 94, and the valves 106, 111, and 112 are opened to evacuate the chamber. As the pressure in the chamber 94 decreases, the molten metal rises therein due to the pressure exerted on the outer portions of the pool 89 by the air in the chambers 93 and 102. If desired, when the chamber 94 is evacuated, the charge chamber 93 and the discharge chamber 102 can be pressurized to provide an even greater pressure differential between the chambers. The vacuum in the chamber 94 establishes a differential pressure across the packs 117 by removing air therefrom and also by enabling the molten metal to rise through the packs 117 to fully immerse them. After the metal has been at a level above the packs 117 for a predetermined period of time, the valve 106 is closed and the valve 115 in the vent 116 is opened to restore atmospheric pressure in the chamber 94 and to lower the level of the molten metal to its original height. The doors 96 and 99 are then immediately opened and the conveyor 98 operated to transfer coated packs, which are designated 118, to the discharge conveyor 103, the packs passing between a pair of squeeze rollers 119 which can be chilled by a coolant passing therethrough. When the molten metal drops below the packs 118, some tends to drain out and leave voids therein. However, the squeeze rollers 119 compress the packs 118 to fill the voids and also chill and solidify the metal at the outer surfaces of the packs 118 to prevent further loss of metal. Thus, a solid pack is assured. At the time the conveyor 98 transfers a pack or packs 118 to the conveyor 103, the conveyor 91 is operated to transfer an uncoated pack or uncoated packs 117 to the conveyor 98 so that a new coating cycle can begin.

FIG. 15 shows a modified furnace indicated generally at 120, similar to the furnace 87 except that the squeeze rollers 119 are removed and a conveyor 121 is substituted for the conveyor 98. The furnace 120 is also supplied with a protective gas to prevent oxidation of the molten metal. Because it is desirable to avoid wasting of a portion of the gas each time the chamber 94 is evacuated, a receiving tank 122 is employed. The gas is pumped by a vacuum pump 123 from the chamber 94 through an inlet line 124 and an outlet line 125. When the chamber 94 is to be evacuated, a valve 126 in the line 124 is opened and the pump 123 transfers the protective gas from the chamber 94 to the receiving tank 122. When it is desired to restore atmospheric pressure in the chamber 94, the pump 123 is shut off and a valve 127 in a by-pass line 128 is opened to enable the gas in the receiving tank 122 to flow back into the chamber 94. A valve 129 in a supply line 130 is then opened to supply additional protective gas from a suitable source to the receiving tank 122 and thence, to the chamber 94 to maintain a slight positive pressure in the chamber 94 and prevent infiltration of air thereinto.

The conveyor 121 has a plurality of segmented pans 131, each pivotally attached at two points to a chain or belt 132 of the conveyor. The packs 117 on the charge conveyor 91 are synchronized with the pans 131 so that each pack is transferred from the charge conveyor 91 directly into one of the pans. When the chamber 94 is evacuated by the pump 123, the molten metal rises and flows into the pans 131 to impregnate the packs 117. Subsequently, after the protective gas is restored to the chamber 94 through the line 128, and the level of the molten metal falls, the pans 131 prevent any substantial drainage of the metal from the packs. When impregnated packs 118 are transferred to the discharge conveyor 103, the pans move around the belt 132 and dump any molten metal back into the pool 89. The temperature of the discharge chamber 102 is sufficiently low that the exterior metal of the packs 118 is cooled enough to prevent substantially any drainage of metal therefrom.

Instead of the squeeze rollers 119 or the pans 131, air pipes 133 and nozzles 134 can be employed as shown in FIG. 16 for an equivalent purpose. The pipes 133 are located below the upper run of a loose mesh conveyor belt 135 and are directed toward packs supported thereon. When the packs have been impregnated with metal, and the level of the molten metal has dropped below the nozzles 134, air or another gas is supplied through the pipes 133 from a source outside the chamber 94, and is directed against the bottoms or lower surfaces of the coated packs 118. The air immediately cools the lower surfaces, causing solidification of the metal and preventing substantially any of it from draining from the packs 118. If a protective gas is supplied to the chamber 94 through the nozzles 134 to similarly cool the metal in the packs 118, it also constitutes make-up gas for the chamber 94.

If the level of the molten metal in the chamber 94 of FIGS. 14 and 15 rises rapidly, or if the density of the glass fibers is much less than that of the metal, the packs 117 will have a tendency to float on the metal. In such instances, a baffle or upper conveyor can be placed just above the upper surfaces of the packs 117 to hold them in their respective positions as the level of the molten metal rises above them.

It will be apparent that various changes and modifications can be made from the specific details of the invention shown in the attached drawings and discussed in connection therewith without departing from the spirit and scope of the attached claims. In its essential details the invention provides a method for producing glass-reinforced metal articles. Such method comprises intimately associating a molten metal with a mass of a glass reinforcement within a cavity, and associated with a gas under a lower pressure than the metal, and converting the metal to a solid condition.

What we claim is:

1. A method for producing a glass-reinforced metal article which comprises bringing the metal, in a molten condition, into contact with a mass of a glass reinforcement contained within a cavity which at least partially encloses a gas under a lower pressure than the liquid metal, the difference between the gas pressure and the metal pressure being sufficiently great to force the metal into contact with substantially all parts of the reinforcement, venting from the cavity gas displaced by the metal, and contacting an outer surface of the molten metal associated with the glass reinforcement with a chilled body to cool rapidly the outer surface of the metal.

2. A method for producing a glass-reinforced metal article which comprises bringing the metal, in a molten condition, into contact with a mass of a glass reinforcement contained within a cavity which encloses a gas at less than atmospheric pressure, the metal being at a pressure sufficiently higher than the gas pressure that the metal is forced into contact with substantially all parts of the reinforcement, venting from the cavity low pressure gas displaced by the liquid metal, and directing a stream of a cool gas against an outer surface of the molten metal associated with the glass reinforcement to cool rapidly the outer surface of the metal.

3. A method for semi-continuously producing a fibrous glass-reinforced metal article which comprises moving a mass of glass fibers into a cavity which has a volume greater than the volume of the mass, maintaining a supply of molten metal in a bottom portion of the cavity, bringing the metal, in a molten condition, into contact with the mass of glass fibers contained within the cavity by decreasing gas pressure therein to less than atmospheric pressure, the metal being at a pressure sufficiently higher than the gas pressure that the metal is forced into contact with substantially all parts of the fibers, venting from the cavity low pressure gas displaced by the liquid metal, raising the pressure in the cavity to atmospheric to decrease the level of the molten metal not associated with the glass reinforcement, solidifying the metal, and moving the reinforcement and the metal associated therewith out of the cavity.

References Cited in the file of this patent

UNITED STATES PATENTS

| | | |
|---|---|---|
| 1,514,151 | Gerdien | Nov. 4, 1924 |
| 1,531,472 | Baker | Mar. 31, 1925 |
| 1,535,134 | Rockwood et al. | Apr 28, 1925 |
| 1,725,144 | Kadow | Aug. 20, 1929 |
| 2,559,572 | Stalego | July 3, 1951 |
| 2,612,443 | Goetzel et al. | Sept. 30, 1952 |
| 2,745,437 | Comstock | May 15, 1956 |
| 2,897,556 | Chini | Aug. 4, 1959 |
| 2,932,071 | Whitehurst | Apr. 12, 1960 |
| 3,047,409 | Slayter et al. | July 31, 1962 |

FOREIGN PATENTS

| | | |
|---|---|---|
| 416,156 | Italy | Nov. 20, 1946 |